United States Patent

Gross

[11] 4,111,058

[45] Sep. 5, 1978

[54] ELECTRICALLY SCANNED PRESSURE SENSOR MODULE WITH IN SITU CALIBRATION CAPABILITY

[75] Inventor: Chris Gross, Yorktown, Va.

[73] Assignee: The United States of America as represented by the Administrator of the National Aeronautics and Space Administration, Washington, D.C.

[21] Appl. No.: 835,628

[22] Filed: Sep. 22, 1977

[51] Int. Cl.² .......................... G01L 7/00; G01L 9/06
[52] U.S. Cl. ...................................... 73/714; 73/4 R; 73/147; 73/721; 73/756
[58] Field of Search ................. 73/147, 4 R, 756, 754, 73/721, 727, 714

[56] References Cited

U.S. PATENT DOCUMENTS 3,689,748  9/1972  Bothne .................................. 73/4 R

*Primary Examiner*—Donald O. Woodiel

*Attorney, Agent, or Firm*—William H. King; John R. Manning; Howard J. Osborn

[57] ABSTRACT

This invention is a high data rate pressure sensor module with an in situ calibration capability to help reduce energy consumption in wind tunnel facilities without loss of measurement accuracy. The sensor module allows for nearly a two order of magnitude increase in data rates over conventional electromechanically scanned pressure sampling techniques. The module consists of 16 solid state pressure sensor chips and signal multiplexing electronics integrally mounted to a four position pressure selector switch. One of the four positions of the pressure selector switch allows the in situ calibration of the 16 pressure sensors; the three other positions allow 48 channels (three sets of 16) pressure inputs to be measured by the sensors. The small size of the sensor module will allow mounting within many wind tunnel models, thus eliminating long tube lengths and their corresponding slow pressure response.

10 Claims, 10 Drawing Figures

4,111,058

ELECTRICALLY SCANNED PRESSURE SENSOR MODULE WITH IN SITU CALIBRATION CAPABILITY

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

During the past few years, the need for wind tunnel pressure measurement systems with higher data rates has become acute. Currently the need for higher data rates revolves around achieving a more economical operation of these energy intensive facilities through continuous pitch and pitch-pause modes of operations, active tunnel control, and real-time data analysis and display. Higher data rates for pressure measurements are also needed, as they have been in the past, for wind tunnels with short run times. The major obstacle in achieving high data rates from pressure measurement systems has been most often the pressure sensing scheme. Modern computer-based data acquisition systems allow data rates of 50,000 measurements per second (MPS) and greater, yet the electromechanically scanned pressure sensors most often used for wind tunnel pressure measurements allow a maximum data rate of only about 10 MPS. These electromechanically scanned pressure sensors can be paralleled to achieve a somewhat higher data rate, but still not one that is commensurate with that of the data acquisition systems. The use of individual pressure transducers to achieve a high data rate is often impractical because of size requirements and cost.

Some progress in developing pressure sensing concepts with potentially high data rates has been made recently. A miniature 25-channel pressure sensing module consisting of 25 silicon diaphragm pressure sensors mounted to a header plate has been developed. (Mallon, J. R., Kurtz, A. D., and Coe, C., "Twenty-Five Channel Electrically Scanned Solid State Pressure Transducer," Instrument Society of America. Twentieth International Instrumentation Symposium, Albuquerque, NM, May 21–23, 1974). This module allows high data rates since the electrical outputs of the pressure sensors can be electronically scanned. However, this sensor module does not permit a full in situ calibration, therefore corrections for zero and sensitivity shifts usually associated with these sensors cannot be made. Another pressure measurement system (Armentrout, E. C., "On-Line Calibration of High-Response Pressure Transducers During Jet-Engine Testing." Society of Automotive Engineers. National Aerospace Engineering and Manufacturing Meeting, San Diego, CA, Oct. 1–3, 1974) has been developed that allows a full in situ calibration of individual silicon diaphragm pressure sensors, but the system is too large to be mounted in most wind tunnel models. The data rate of this system is generally determined by the lengths of the tubes from the pressure ports to the sensors. Another concept advanced employs miniature pressure switches adjacent to the pressure sensors to allow in situ calibration (U.S. Pat. No. 3,777,546) and in those instances where model size permits, high data rates are possible with this scheme.

It is the primary object of this invention to provide a pressure sensor module that largely overcomes the drawbacks of the above-mentioned systems.

Another object of this invention is to provide a pressure sensor module that is small in size, that has a high data rate and that has high accuracy through a full in situ calibration capability.

A further object of this invention is to provide a pressure measuring system that has a high data rate and an in situ calibration capability.

Other objects and advantages of this invention will become apparent hereinafter in the specification and drawings.

SUMMARY OF THE INVENTION

The invention consists essentially of $n$ solid state pressure sensor chips and signal multiplexing electronics integrally mounted to an $m$ position pressure selector switch. In one of the positions of the pressure selector switch a calibrating pressure source is connected to all of the pressure sensor chips, and in each of the other $m-1$ positions of the pressure selector switch pressures from $n$ different locations are connected to the pressure sensor chips. During the time that the pressure selector switch is at each of its positions a digital code is applied to the multiplexing electronics which multiplexes the analog outputs of all of the sensors into a single output. Consequently the invention will measure pressures at $n(m-1)$ different locations and provide in situ calibration of the $n$ pressure sensor chips. For the specific embodiment of the invention described in this application, $n$ is equal to 16 and $m$ is equal to 4.

DETAILED DESCRIPTION OF THE INVENTION

Figure 1:
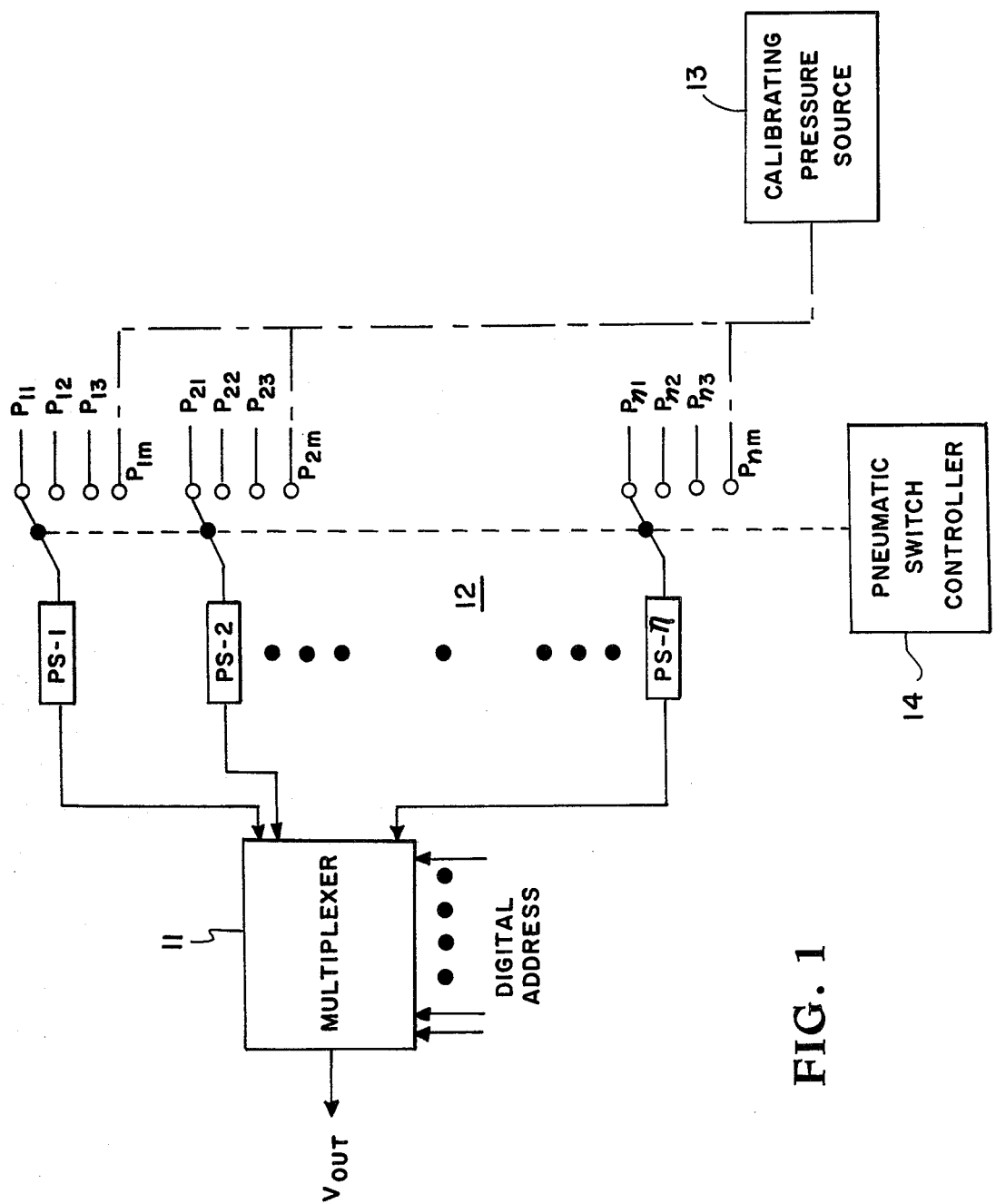
FIG. 1 is a block diagram of the invention.

A general embodiment of the invention is shown in a block diagram in FIG. 1. Pressure sensor chips PS-1, PS-2 . . . PS-$n$ have their electrical analog outputs connected to a multiplexer 11. Pressures are applied to the pressure sensor chips through a pressure selector switch 12 having $m$ positions. While switch 12 is in one position (the $m$th position in the drawing) a calibrating pressure is applied to all pressure sensor chips from a calibrating pressure source 13. In all other positions of switch 12, unknown pressures at $n$ different locations are applied to the $n$ pressure sensor chips. Hence, the $n$ pressure sensors can be calibrated and pressures at $n(m-1)$ different locations can be measured by the embodiment of the invention in FIG. 1. A pneumatic switch controller 14 is used to control the positions of switch 12. Each time the position of switch 12 is changed by controller 14 a digital code is applied to multiplexer 11. This digital code multiplexes the $n$ analog signals at the outputs of the sensor chips onto a single output. Hence the output of multiplexer 11 is a serial output representing the pressures at the different locations and the responses of the sensor chips to the calibrating pressures.

Figure 2:
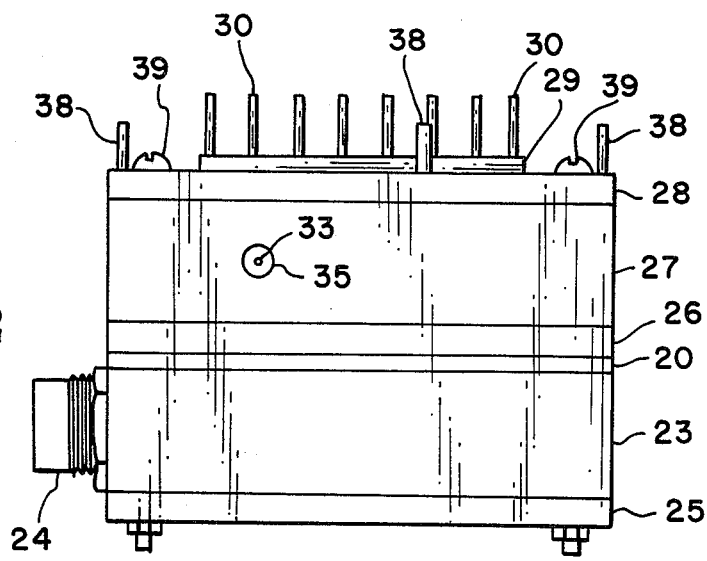
FIG. 2 is a side view of the specific embodiment of the invention selected for illustration.
Figure 3:
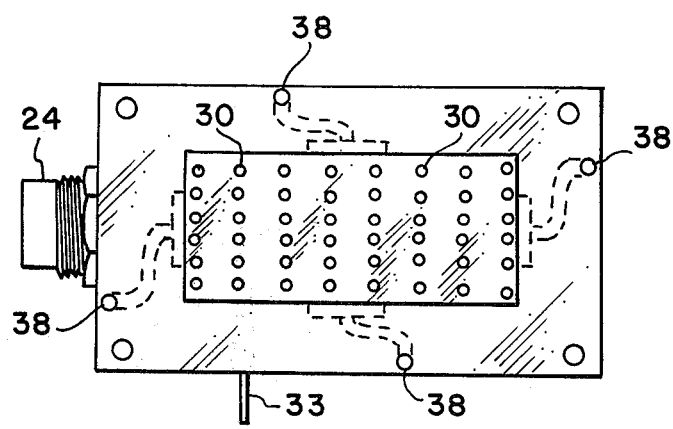
FIG. 3 is a top view of the embodiment of the invention shown in FIG. 2.
Figure 6:
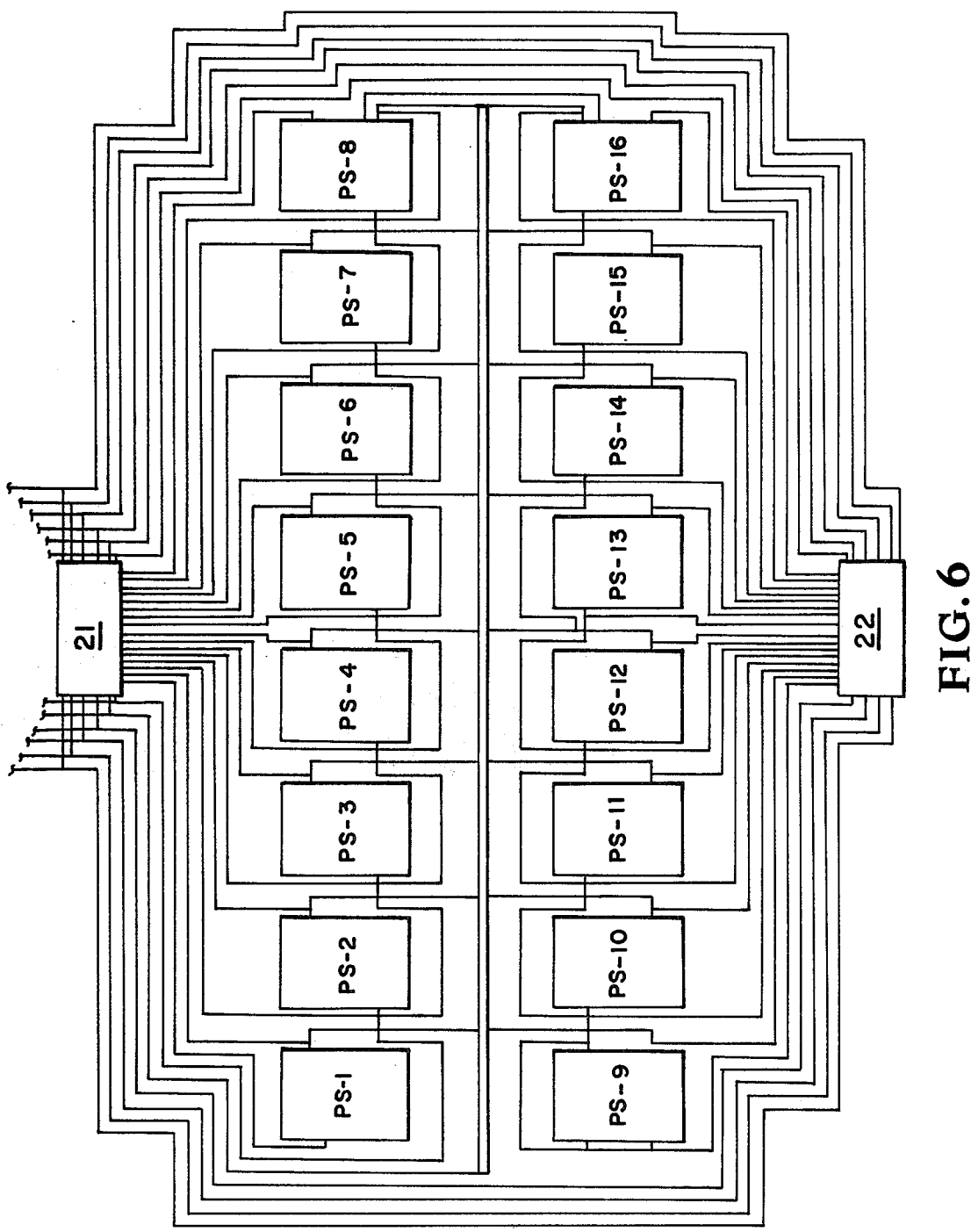
FIG. 6 is a bottom view of the substrate containing the sensors and multiplexing circuitry.
Figure 9:
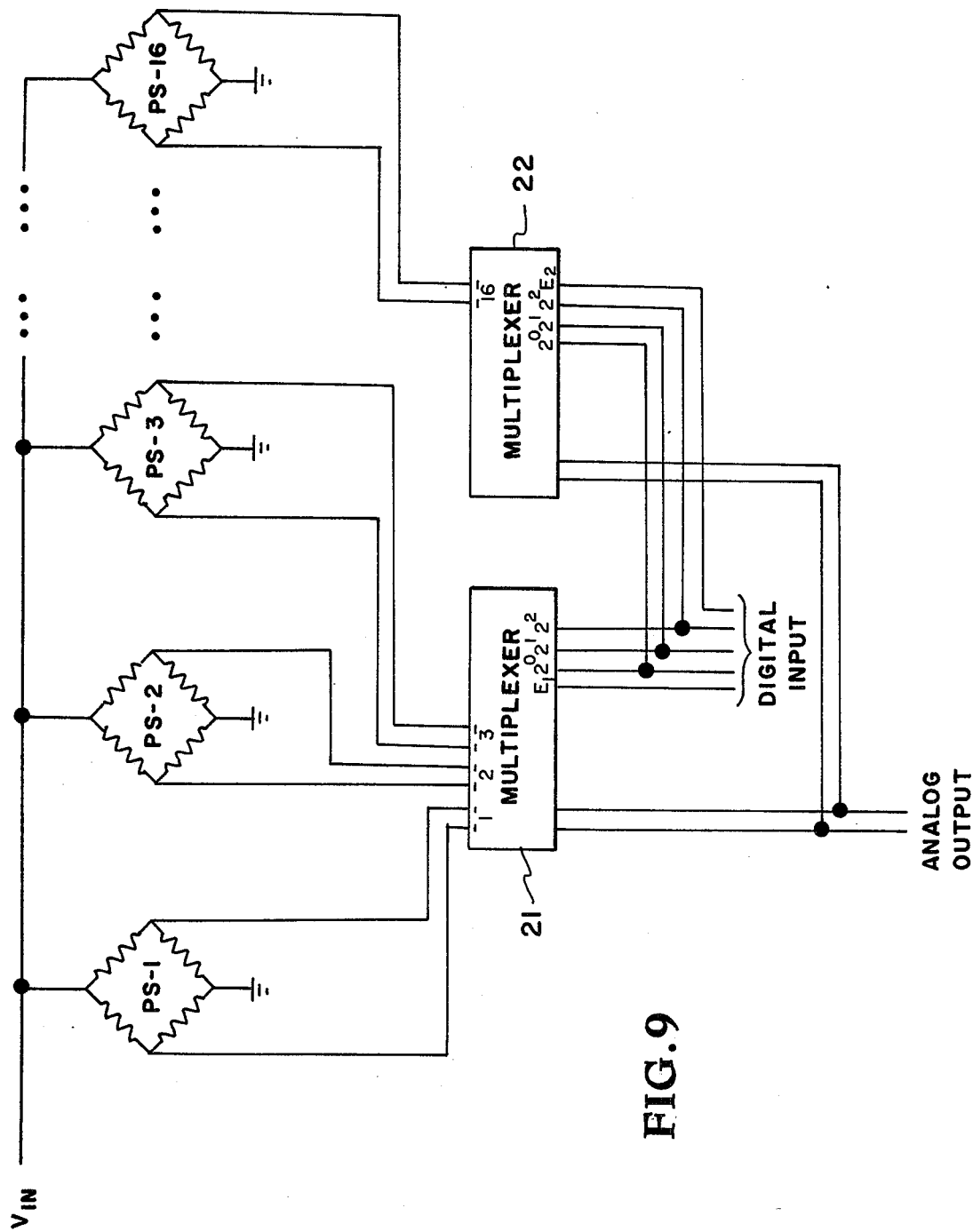
FIG. 9 is a schematic drawing of the multiplexing circuitry used in this invention.

Turning now to the specific embodiment of the invention selected for illustration in the drawings, FIGS. 2 and 3 are side and top views, respectively, of an embodiment of this invention in which $n$ is equal to 16 and $m$ is equal to 4. The number 20 in FIG. 2 designates a substrate containing 16 solid state pressure sensor chips interconnected by means of etched metal interconnections with two 8 channel-dual multiplexers 21 and 22 as shown in FIG. 6. A block diagram of this circuitry is shown in FIG. 9. Each silicon diaphragm pressure sensing chip contains four junction isolated piezoresistance strain sensing elements in a Wheatstone bridge configuration. Pressure is determined by the change in bridge output due to varying pressure induced stresses. The outputs of the first eight bridges are applied to multiplexer 21 and the outputs of the second eight bridges are applied to multiplexer 22. The 16 sensor array may be scanned at high data rates by addressing each sensor with a specific digital code placed on digital inputs $2^0$, $2^1$, $2^2$ and enables $E_1$, $E_2$. A suitable code is as follows:

| Channel | $E_1$ | $E_2$ | $2^0$ | $2^1$ | $2^2$ |
|---|---|---|---|---|---|
| 1 | 1 | 0 | 0 | 0 | 0 |
| 2 | 1 | 0 | 1 | 0 | 0 |
| 3 | 1 | 0 | 0 | 1 | 0 |
| . | . | . | . | . | . |
| . | . | . | . | . | . |
| . | . | . | . | . | . |
| 8 | 1 | 0 | 1 | 1 | 1 |
| 9 | 0 | 1 | 0 | 0 | 0 |
| 10 | 0 | 1 | 1 | 0 | 0 |
| . | . | . | . | . | . |
| . | . | . | . | . | . |
| 15 | 0 | 1 | 1 | 1 | 1 |

A differential output of the selected pressure sensor is present on the analog output lines. After amplification the analog signal is input to an analog-to-digital converter (not shown) to digitize the data.

Electrical wires are connected to the electrical circuitry on substrate 20 inside a housing 23 and extend out of the housing through a connector 24. A plate 25 covers housing 23.

Figure 5:
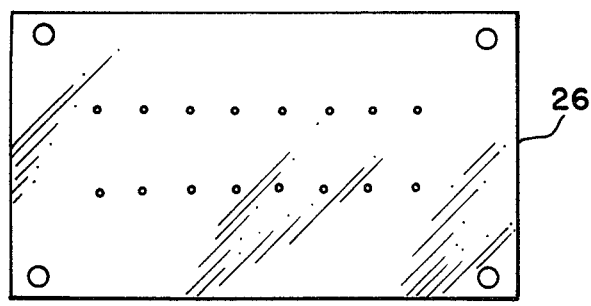
FIG. 5 is a top view of the stator plate.

Substrate 20 is bonded to a stator plate 26. A top view of stator plate 26 is shown in FIG. 5. Sixteen ports extend through the plate and each terminates onto a corresponding one of the pressure sensor chips. Hence, the pressure applied to each of the ports in stator plate 20 causes the corresponding chip and its associated Wheatstone bridge to generate an analog voltage related to the pressure.

A housing 27 is mounted on stator plate 26 and a top plate 28 is mounted on housing 27. A moveable plate 29 has 48 pressure ports 30 through it and through top plate 28. Top plate 28 has grooves in it for passage of the pressure ports 30 through plate 28 and for allowing some movement of plate 29 relative to plate 28.

Figure 7:
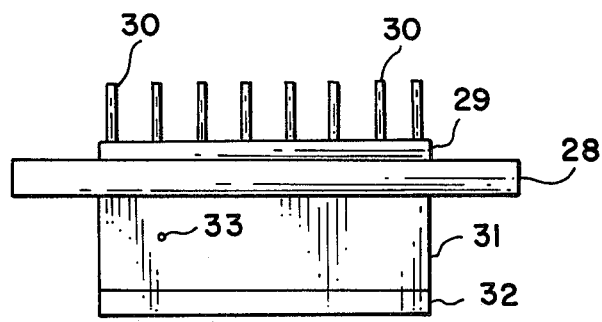
FIG. 7 is a side view of the plates contained inside housing 27 in FIG. 2.
Figure 8:
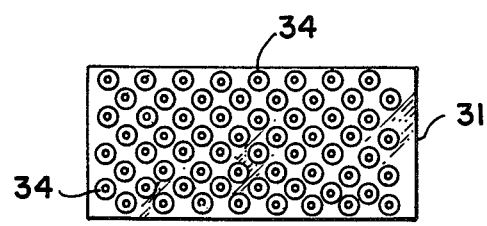
FIG. 8 is a bottom view of plate 31 shown in FIG. 7.

As shown in FIG. 7 the pressure ports 30 extend through top plate 28 to a calibrating port adding plate 31 which is mounted on a multiplexer plate 32. A calibrating pressure port 33 extends into plate 31 for applying the calibrating pressures to 16 ports that begin inside plate 31 and end at the lower surface of plate 31. The 48 ports 30 extend through plate 31. Hence, the lower surface of plate 31 which is shown in FIG. 8 has 64 ports in it. Each of the 64 ports has an O-ring 34 around it to O-ring seal it with its corresponding port in the multiplexer plate 32. A hole 35 extends through housing 27 so that port 33 will not restrict movement of plate 31 relative to housing 27.

Figure 4:
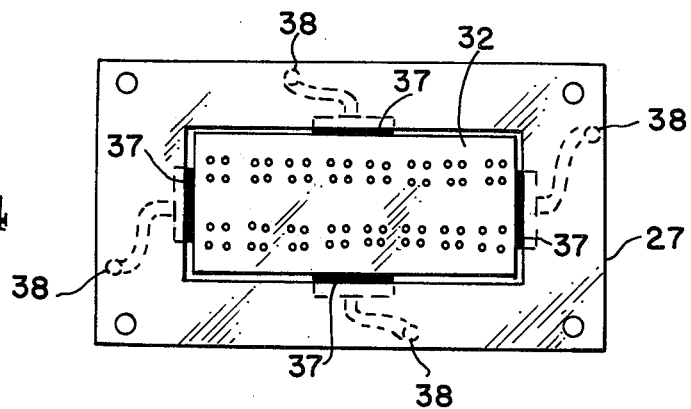
FIG. 4 is a bottom view of the multiplexer plate and the housing surrounding it.

Multiplexer plate 32 has 64 ports in its upper surface that match with the 64 ports in the lower surface of plate 31 (FIG. 8). These ports extend through plate 32 into 16 sets of four ports each as shown in FIG. 4. As can be seen in FIG. 4 plate 32 is slightly smaller than the opening of housing 27. Consequently, plate 32 can move inside the opening. Four rubber pistons 37 are built into housing 27 on the four sides of plate 32. Each of these pistons is connected to a separate port 38. Consequently, when pressure is applied to any two adjacent ports 38, plate 32 and plate 31 are pushed into one of the four corners of housing 27. Hence plate 32 has four controlled positions relative to housing 27. In each of these four controlled positions, one of the ports in each of the sixteen sets of ports in plate 32 alines with one of the 16 ports in stator plate 26. In one of the controlled positions of plate 32, the 16 ports that are alined with the 16 ports in plate 26 are the calibrating ports connected to port 33. In the other controlled positions of plate 32, ports that are connected to unknown pressure points are alined with the ports in plate 26. Plates 25, 26 and 28 and housings 23 and 27 are attached together by four nuts and bolts 39 as shown in FIG. 2.

Figure 10:
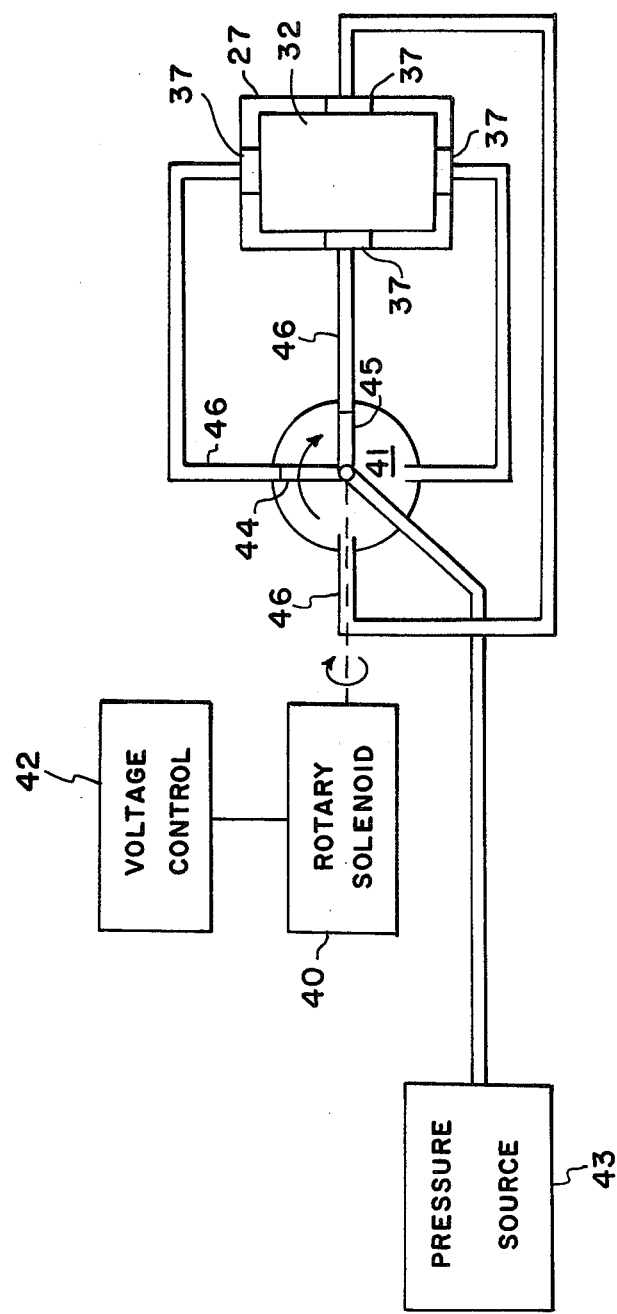
FIG. 10 is a schematic drawing of the pneumatic switch controller used in this invention.

The pneumatic switch controller for use with the pressure sensor module in FIG. 2 is shown in FIG. 10. A rotary solenoid 40 is connected to a pneumatic valve 41. Each time the solenoid is energized by a voltage control 42 the pneumatic valve advances one position. The pneumatic valve has two control pressure ports 44 and 45 that are supplied pressure from a pressure source 43, and stationary ports 46 that are connected to the four ports 38 (FIG. 4) that operate the four pistons 37. While pneumatic valve 41 is in the position shown the two control pressure ports 44 and 45 are alined with two of the stationary ports 46 and the two pistons 37 that have pressure applied to them pushes multiplexer plate 32 into the lower right corner of housing 27. In this position one set of 16 of the ports in the multiplexer plate 32 (FIG. 4) are alined with the 16 ports in plate 26 (FIG. 5). When pneumatic switch 41 advances one step, plate 32 is pushed into the lower left corner of housing 27 by pistons 37. In this position a different set of 16 ports in plate 32 are alined with the 16 ports in plate 26, etc. The pneumatic switch has a switching time of as little as 15 m sec when a pressure of 100 psi is applied to the control pressure ports 44 and 45.

In the operation of this invention the voltage control 42 applies a voltage to rotary solenoid 40 to cause pneumatic switch 41 to advance a position. This connects the pressure source 43 to two adjacent pistons 37 which pushes multiplexer plate 32 into one of the four corners of housing 27. As a result the pressure from 16 selected locations are applied through ports 30, plates 31, 32 and 26 to the 16 pressure sensor chips on substrate 20. The resulting 16 analog signals are multiplexed onto the output of the multiplexer by means of a digital code applied to the multiplexer. The voltage control 42 then applies another voltage to rotary solenoid 40 and the process is repeated.

The pressure sensor module in FIG. 2 can be made from any suitable material such as for example stainless steel and one of the modules that has been built has dimensions of $4.3 \times 2.48 \times 2.4$ cm giving it a volume of 25.7 cm$^3$.

Even though in the specific embodiment of the invention disclosed $n$ was chosen to equal to 16 and $m$ was chosen to equal 4, it is obvious that other values could have been chosen. $n$ can obviously be any number chosen and $m$ could be three if plates 31 and 32 were triangular in shape or $m$ could be five if plates 31 and 32 were in the shape of a pentagon, etc.

What is claimed is:

1. A pressure sensor module comprising:
    a pressure sensor substrate board including $n$ pressure chips and a multiplexer thereon where $n$ is a whole number greater than one;
    said multiplexer connected to said pressure chips and including means such that when a digital code is applied to said multiplexer the analog outputs of said pressure chips sequentially appear at the output of said multiplexer;
    a stator plate with $n$ ports through it with each port on one side of the stator plate terminating onto a corresponding one of said pressure chips;
    a pressure multiplexer plate in contact with the side other than said one side of the stator plate;
    said pressure multiplexer plate having $n$ groups of $m$ ports through it where $m$ is a whole number greater than one;
    means for connecting $n$ of said ports in said pressure multiplexer plate to a calibrating pressure source;
    means for connecting the other $n(m-1)$ ports in said pressure multiplexer plate to the locations where pressures are to be measured; and
    means for selectively moving said pressure multiplexer plate to $m$ positions with a different set of $n$ ports through it alined with the $n$ ports through said stator plate in each of the said $m$ positions and with the said set of $n$ ports connected to a calibrating pressure source being one of said different sets.

2. A pressure sensor module according to claim 1 wherein $m$ is equal to 4.

3. A pressure sensor module according to claim 2 wherein the shape of said pressure multiplexer plate is rectangular.

4. A pressure sensor module according to claim 3 wherein said pressure multiplexer plate is housed in a rectangular housing and said means for selectively moving said pressure multiplexer plate to four positions is means for moving said pressure multiplexer plate to the four corner positions inside said housing.

5. A pressure sensor module according to claim 4 said means for selectively moving said pressure multiplexer to the four corner positions inside said housing includes a piston in each of the four walls of the housing that will push against said pressure multiplexer plate when a pressure is applied to it and means for alternately applying pressure to adjacent pairs of said pistons to push the pressure multiplexer plate into the four corners of said housing.

6. A pressure sensor module according to claim 5 wherein said means for applying pressure to adjacent pairs of said pistons includes a two moveable port pneumatic switch.

7. A pressure sensor module comprising:
    $n$ pressure sensors where $n$ is a whole number greater than one;
    $n(m-1)$ ports for connections to selected locations where pressures are to be measured where $m$ is a whole number greater than one;
    $n$ ports for connections to a calibrating pressure source;
    switching means have $m$ positions for connecting the total of the above mentioned $n$ and $n(m-1)$ ports to said $n$ pressure sensor $n$ at a time; and
    multiplexer means connected to said $n$ pressure sensors and responsive to a digital code for multiplexing the outputs of said $n$ pressure sensors onto a single line each time said switching means changes positions.

8. A pressure sensor according to claim 7 wherein said switching means includes a stator plate with $n$ ports in it that terminate onto said $n$ pressure sensors, a multiplexer plate with $n$ groups of $m$ ports in it, and means for moving said multiplexer to $m$ different locations such that in each location the ports in said multiplexer plate is alined with a different set $n$ of the $n(m-1)$ and $n$ ports connected to the selected locations and the calibrating pressure source.

9. A pressure sensor according to claim 8 wherein $m$ is equal to 4.

10. A pressure sensor according to claim 9 wherein said multiplexer plate is rectangular in shape.

* * * * *